Figure 3:
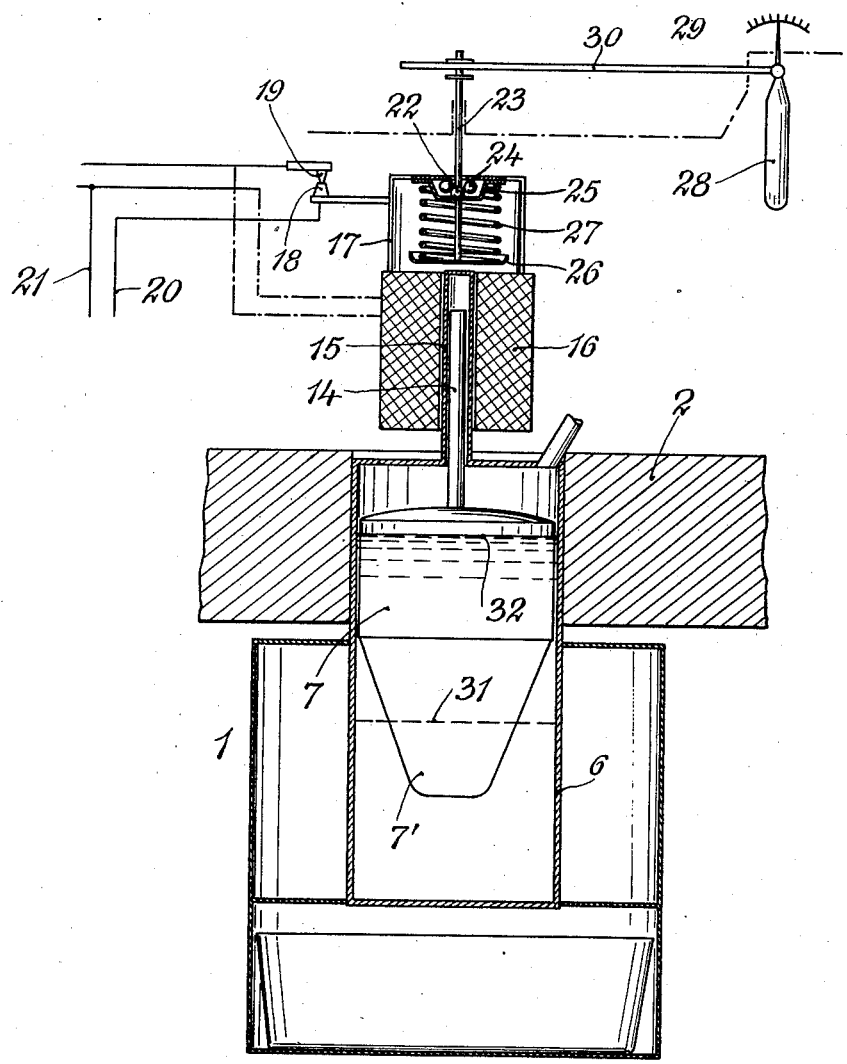

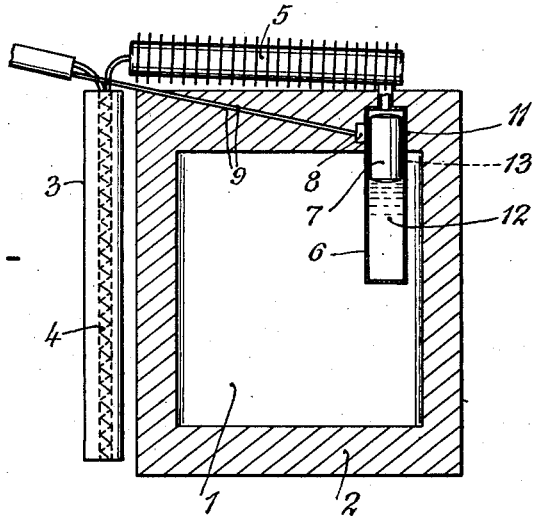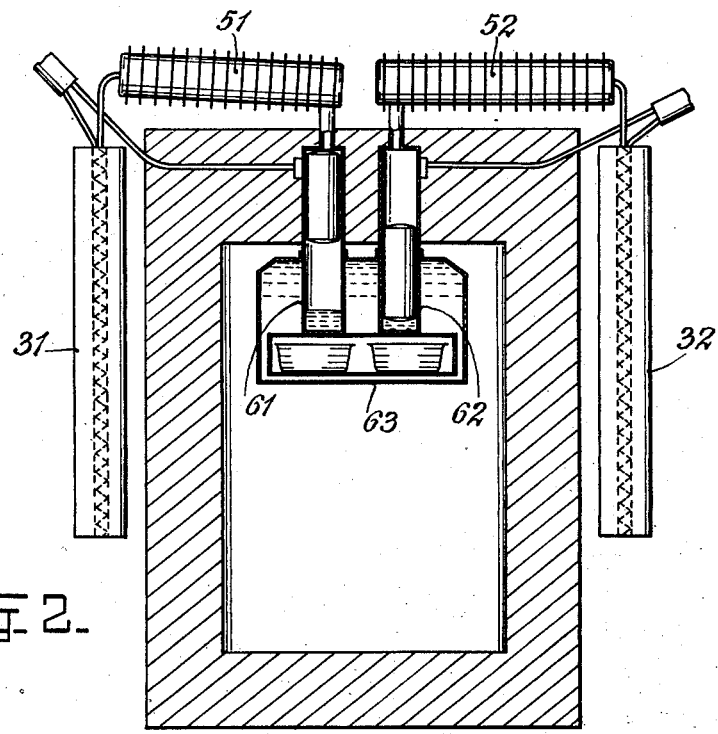

Dec. 31, 1940.　　　S. J. STEENSEN　　　2,227,165
EVAPORATOR FOR PERIODICAL ABSORPTION REFRIGERATING PLANTS
Filed May 23, 1939　　　2 Sheets-Sheet 2

Inventor,
S. J. Steensen
By: Glascock Downing & Seebold
Attys.

Patented Dec. 31, 1940

2,227,165

UNITED STATES PATENT OFFICE 2,227,165

EVAPORATOR FOR PERIODICAL ABSORPTION REFRIGERATING PLANTS

Sverre Johan Steensen, Ullevaal Haveby, near Oslo, Norway

Application May 23, 1939, Serial No. 275,310
In Norway October 16, 1937

12 Claims. (Cl. 62—5)

In periodical absorption refrigerating plants there exists the problem to prevent the vapours during the expelling of the refrigerating liquid vapours by boiling on the boiler from reaching on to the evaporator before they have been condensed.

This problem has been met with great difficulties. Float valves and similar locking valves have been proposed or collecting vessels have been arranged in an insulated state in the cooling compartment or in the insulating material of same.

In all cases great losses arise as to cooling effect, because the collecting vessel is first heated during the vaporization and is then strongly cooled during the cooling period, and this cold can not be utilized in the refrigerating compartment.

The said losses are one of the principal reasons for the bad thermal efficiency of periodical refrigerating apparatus and the said drawbacks have been removed in a simple and cheap manner by the present invention without any valves and appertaining parts being necessary, it being very difficult to get such values quite tight. Moreover, no extra insulated collecting vessels are necessary. The vapours are condensed first outside the refrigerating compartment and flow in the form of condensate into the evaporator. The latter according to the invention is combined with a device whereby its cold liquid may be displaced from same to a greater or less degree in such a manner that the liquid level in the interior of the evaporator is raised to a level which is located outside the refrigerating compartment into which the evaporator projects.

Preferably the device consists in a displacement body which is arranged movably or adjustably in the interior of the evaporator. Said body may be made similar to a piston which is easily but comparatively narrowly movable in the evaporator, so that the refrigerating liquid can only move in small quantities past the piston down into the bottom portion of the evaporator during the boiling period. If now said body is made as a float in the refrigerating liquid, so as to be raised or lowered together with the liquid level, the float at the commencement of this period during which a small quantity of liquid may be present in the evaporator, will displace a substantial portion of the liquid, whereby the level of same is maintained sufficiently high to prevent the portion of the evaporator projecting into the refrigerating compartment from being contacted interiorly by refrigerating medium in the state of vapours.

According as more condensate (refrigerating liquid) during the expelling or boiling period flows down into the evaporator, this condensate will raise the displacement float, and when the expelling is exhausted, the float has been quite or partly driven out from the evaporator, whereas the condensate has taken its place.

In such a raised position the float may be maintained during the cooling period by means of a device suitable thereto, so that the float during the whole cooling period is maintained in an inoperative state outside the evaporator. But as soon as the next boiling is to be commenced, one lets the float again fall down into the liquid in the interior of the evaporator.

In order to hold fast the float in a raised position an electromagnet may be used which obtains current during the cooling periods, but the current of which is interrupted during the boiling and expelling of the refrigerating liquid vapours from the boiler. The magnet draws the float inwardly against the evaporator wall so as to hold same fast from the moment whereupon the boiling current is cut off and on to the moment when it is again cut in. Then the magnet current is cut off, whereby the float falls down and forces the liquid upwards along the sides, so that the liquid level will be located outside the top face of the refrigerating compartment, so as to stop any inlet of vapour.

Of course, other manners of holding fast the float than a magnet may be used.

The invention comprises also a method for automatical closing and opening of the electric heating current for the boiler and consists in the liquid level in the evaporator being utilized for interrupting and closing the current, so that interruption takes place when the level is high and closing when the level is low. Thereby it is possible at periodical expelling of the vapours to regulate automatically the expelled quantity to a predetermined quantity, and also to start a new boiling or expelling at the moment whereupon the expelled quantity has been evaporated. These two things in connection with a third one, viz: to prevent the vapour from entering to the portion of the evaporator surface located inside the refrigerating compartment, are deciding for the operation and efficiency of an absorption refrigerating apparatus.

In order to carry out the said method the magnet may be movably suspended and connected with the current interrupter for the boiler current in such a manner that the interrupter is operated by the movement of the magnet in one direction or the other.

For this purpose an iron bar on the float is made as a core for the magnet which is made in the form of a solenoid. The magnet may be suspended by means of a snap lock which yields as soon as the weight of the solenoid together with the weight of the portion of the float acting thereupon exceeds a certain limit.

The invention is illustrated diagrammatically in Figs. 1-3 of the drawings. Figs. 1 and 2 show a vertical section through the refrigerating box and the evaporator. Fig. 3 shows a vertical section of the evaporator proper and appertaining mechanisms drawn to a larger scale.

In Fig. 1 1 denotes the refrigerating compartment with insulation 2. The boiler 3 is provided with a heating element 4. The condenser is shown at 5, 6 being the evaporator with float 7 and 8 the magnet with conductors 9. The float is floating on the liquid when it is immerged to the position 11.

In the shown position the boiling has just taken place and all vapour has been expelled and the float has been raised into the uppermost position. The current to the boiler 3 is now interrupted. Simultaneously a weak current to the electromagnet 8 is automatically closed. The magnet thereby maintains the float fast by engagement with the wall. According as the temperature of the boiler sinks, the evaporation commences of the liquid in the evaporator 6 under the float 7, consequently in the refrigerating compartment, there being between the walls of the float and the evaporator no volume of importance. The outer surface of the float fits like a piston rather snugly in a cylinder in such a manner that it allows only an inlet of condensate in the form of drops and a free motion of the float up and down.

According as the evaporation increases, the liquid level in the evaporator 6 will lower until it reaches down to the level 12. Here the refrigerating period is interrupted. The boiling current is cut in and simultaneously the magnet current is interrupted, whereby the float falls down. It will thereby displace a portion of the liquid, so that the liquid level is raised up to the position 13, because the float will not float before the liquid has reached this position which is located above the top wall of the refrigerating compartment. Hereby the vapour is prevented from entering into the evaporator proper in the refrigerating compartment. According as the boiling or expelling of vapour expires, the float 7 raises up to its starting point.

As will be seen, a part of the heating surface of the evaporator which takes part of the evaporation, is totally arranged within the refrigerating compartment and this part is never in contact on its interior side with refrigerant in a vaporous state.

Fig. 2 shows the use of the evaporator in connection with two self-reliant boilers 31, 32 and condensers 51, 52 and with evaporators 61, 62 which co-operate in a common evaporator housing 63 filled with liquid for indirect cooling.

The cooling surfaces of the evaporator may of course be built together in many different manners for direct as well as indirect cooling.

In Fig. 3 the lower portion of the float 7 is somewhat tapered as shown at 7'. On the top of the float is arranged a bar 14 of mild iron with a suitable diameter in relation to the float weight. The evaporator and the collecting compartment 6 respectively are passed across the insulating wall 2 of the refrigerating compartment 1 in its roof. The top of the collecting compartment is provided with a pipe 15 having such an interior diameter that the bar 14 of the float may freely move up and down through the pipe 15. Outside the pipe an electromagnet 16 made in the form of a solenoid is arranged. According as the float 7 raises higher and higher up by means of the condensate passing in from the condenser during the expelling period, the mild iron bar 14 approaches the lines of force of the electromagnet 16 until their fields have become so strong that the magnet itself which rests on a snap lock, will suddenly fall down some millimeters and interrupt the current to the heat source. However, thereby the iron bar 14 has arrived still nearer to the center of the force line field and is therefore raised further upwards. Thereby the liquid level again sinks down into the interior of the cooling compartment walls, because a raising of the float 7 some few millimeters represents a larger volume than the intermediate space between the walls of the float and the collecting vessel 6.

When now the solenoid as mentioned falls down, the current to the boiler is again interrupted, the solenoid being suspended in a bow 17 in connection with one 18 of the interrupters 18, 19 for the conductors 20, 21 to the boiler. The electric heating source thus has been put out of operation, and after some time the evaporation of the liquid in the collecting compartment 6 commences. The float 7 which has been pulled into the magnet field, is hanging, however, until the liquid level has been lowered so far down under the uppermost portion of the float 7 that its weight overcomes the magnet force. The float then falls down and presses the liquid level out from the cooling compartment.

At the moment the float is falling down, the magnet loses the load of the float, and it therefore snaps up again and cuts in the current to the heating source. Instead of an electromagnet a permanent magnet may be used.

The bow 17 co-operates with a frictional snap lock which may consist of a central thickening 22 on a rod 23 and a number of balls 24 which are spring-pressed towards the center within a housing 25 on the bow 17. The rod 23 has a lower abutment 26 for one end of a compression spring 27, whose other end presses against the housing 25 or the bow 17.

When the downwardly directed force on the bow 17 becomes sufficiently high, the balls 24 will force themselves past the thickening 22 and the magnet will fall down, but will be caught at a certain compression of the spring 27. The latter represents then an accumulated force which enters in operation as soon as the float 7, as mentioned above, pulls itself off from the magnet and then causes the housing 25 with the balls 24 to snap up again past the thickening into the operative position as shown in Fig. 3.

The rod 23 may be adjusted in the axial direction of the solenoid 16 by means of a handle 28, which is pivoted at 29 and connected with a carrying arm 30 for the rod 23. Thereby the expelled liquid quantity may be varied according to requirements, and also the temperature of the cooling compartment may be adjusted. If the arm 28 with the snap lock is adjusted and thereby the solenoid 16 is raised, so that the float 7 must be raised to a higher level in order to enter within the field of the magnetic force line, the expelled quantity will be increased, or the solenoid is lowered, if the opposite result is desired.

But the liquid level is maintained constant at the moment wherein the evaporation is stopped and the boiling is commenced. Thereby it is sure that the boiler can not be boiled quite empty and that the evaporator can not be filled excessively, what might frequently happen in case of boiling for limited intervals. Moreover, an increased consumption of cold will automatically cause more frequent periods.

In Fig. 3 31 denotes the liquid level in the evaporator 6 when the current is closed and 32 denotes the liquid level when the current has been interrupted.

I claim:

1. An evaporator adapted to be arranged in the refrigerating compartment in periodical absorption refrigerating plants comprising, an evaporator proper containing a refrigerating liquid, a movable liquid-displacing body within the evaporator, means for raising said body to lower the liquid level in the evaporator during the cooling periods and for lowering said body to raise the liquid level to a level outside the refrigerating compartment during the expelling periods.

2. An evaporator according to claim 1 wherein the liquid-displacing body is piston-shaped which is easily and comparatively narrowly movable in the evaporator.

3. An evaporator according to claim 1, wherein the liquid-displacing body is formed as a float in the refrigerating liquid so that it is raised or lowered together with the raising or lowering on the liquid level within the evaporator.

4. An evaporator according to claim 1 including means for maintaining the liquid-displacing body at a high level in the evaporator during the cooling periods.

5. An evaporator according to claim 1, including an electromagnet for maintaining the liquid-displacing body at a high level in the evaporator during the cooling periods, and means in combination with the magnet for rendering the magnet inoperative at the end of the expelling periods.

6. An evaporator according to claim 1, including an electromagnet for maintaining the liquid-displacing body at a high level in the evaporator during the cooling periods, said magnet being movably suspended and so connected with a current interrupter for the expelling current that the interrupter is operated by the movement of the magnet in one direction or the other.

7. An evaporator according to claim 1, wherein the liquid-displacing body is made as a float in the refrigerating liquid so that it is raised or lowered together with the raising or lowering of the liquid level within the evaporator, a solenoid for maintaining the liquid-displacing body at a high level in the evaporator during the cooling periods, an iron bar arranged on the float so as to constitute a core for the solenoids, the solenoid being movably suspended and so connected with a current interrupter for the expelling current that the interrupter is operated by the movement of the solenoid in one direction or the other.

8. An evaporator according to claim 1 wherein the liquid-displacing body is made as a float in the refrigerating liquid so that it is raised or lowered together with the raising or lowering of the liquid level within the evaporator, a solenoid for maintaining the liquid-displacing body at a high level in the evaporator during the cooling periods, a snap-lock carrying the solenoid, an interrupter for the expelling current connnected with the solenoid so as to be opened at downward movement of the solenoid, an iron bar arranged on the float so as to constitute a core for the solenoid, said snap-lock being arranged to yield and thereby to drop the solenoid with core and float an to open the interrupter as soon as the weight of the solenoid in addition to the part of the float weight acting thereupon exceeds a certain limit.

9. An evaporator according to claim 1 wherein the liquid-displacing body is made as a float in the refrigerating liquid so that it is raised or lowered together with the raising or lowering of the liquid level within the evaporator, a solenoid for maintaining the liquid-displacing body at a high level in the evaporator during the cooling periods, a snap-lock carrying the solenoid, an interrupter for the expelling current connected with the solenoid so as to be opened at downward movement of the solenoid, an iron bar arranged on the float so as to constitute a core for the solenoid, said snap-lock being adjustable in the axial direction of the solenoid and being arranged to yield and thereby to drop the solenoid with core and float and to open the interrupter as soon as the weight of the solenoid in addition to the part of the float weight acting thereupon exceeds a certain limit.

10. An evaporator according to claim 1 wherein the liquid-displacing body is made as a float in the refrigerating liquid so that it is raised or lowered together with the raising or lowering of the liquid level within the evaporator, a solenoid for maintaining the liquid-displacing body at a high level in the evaporator during the cooling periods, a snap-lock carrying the solenoid, an interrupter for the expelling current connected with the solenoid so as to be opened at downward movement of the solenoid, an iron bar arranged on the float so as to constitute a core for the solenoid, said snap-lock being arranged to yield and thereby to drop the solenoid with core and float and to open the interrupter as soon as the weight of the solenoid in addition to the part of the float weight acting thereupon exceeds a certain limit, a stationary abutment spring connected with the solenoid and with one member of the lock so that the abutment when the snap-lock is yielding catches the solenoid elastically during the compression of the spring.

11. An evaporator according to claim 1 wherein the liquid-displacing body is made as a float in the refrigerating liquid so that it is raised or lowered together with the raising or lowering of the liquid level within the evaporator, a solenoid for maintaining the liquid-displacing body at a high level in the evaporator during the cooling periods, a snap-lock carrying the solenoid, an interrupter for the expelling current connected with the solenoid so as to be opened at downward movement of the solenoid, an iron bar arranged on the float so as to constitute a core for the solenoid, said snap-lock being arranged to yield and thereby to drop the solenoid with core and float and to open the interrupter as soon as the weight of the solenoid in addition to the part of the float weight acting thereupon exceeds a certain limit, an abutment connected with a stationary part of one snap-lock member and adjustable in the axial direction of the solenoid and spring connected with the solenoid so that the abutment when the snap-lock is yielding catches the solenoid elastically during the compression of the spring.

12. An evaporator according to claim 1, wherein the liquid-displacing body is made as a tapered float in the refrigerating liquid, so that it is raised or lowered together with the raising or lowering of the liquid level within the evaporator.

SVERRE JOHAN STEENSEN.